United States Patent

[11] 3,540,499

| [72] | Inventors | Martin I. Sheps<br>Baltimore;<br>Francis J. Rosenthal, Jr., Fork, Maryland |
|---|---|---|
| [21] | Appl. No. | 743,457 |
| [22] | Filed | July 9, 1968 |
| [45] | Patented | Nov. 17, 1970 |
| [73] | Assignee | The Black and Decker Manufacturing Company<br>Towson, Maryland<br>a corporation of Maryland |

[54] RADIAL ARM SAW CONSTRUCTION
10 Claims, 5 Drawing Figs.

| [52] | U.S. Cl. | 143/6 |
|---|---|---|
| [51] | Int. Cl. | B27 5/20 |
| [50] | Field of Search | 143/6, 6—1, 47—6; 83/581 |

[56] References Cited
UNITED STATES PATENTS

| 2,142,303 | 1/1939 | Crouch | 143/6 |
|---|---|---|---|
| 2,584,863 | 2/1952 | Gesner | 143/6 |
| 2,870,801 | 1/1959 | Cravens | 143/6 |

Primary Examiner—Donald R. Schran
Attorney—Leonard Bloom and Joseph R. Slotnick

ABSTRACT: The device disclosed herein is a radial arm saw which includes a base frame having an upstanding column pivoted thereon about a vertical axis. A radial arm is integral with the column and has a saw carriage supported thereon for movement longitudinally thereof. A motor-driven saw is suspended from the carriage and is adapted to cut workpieces situated on a table supported upon the base frame.

Patented Nov. 17, 1970

3,540,499

INVENTORS
MARTIN I. SHEPS
FRANCIS J. ROSENTHAL, JR.

BY Joseph R. Ostrolenk

ATTORNEY

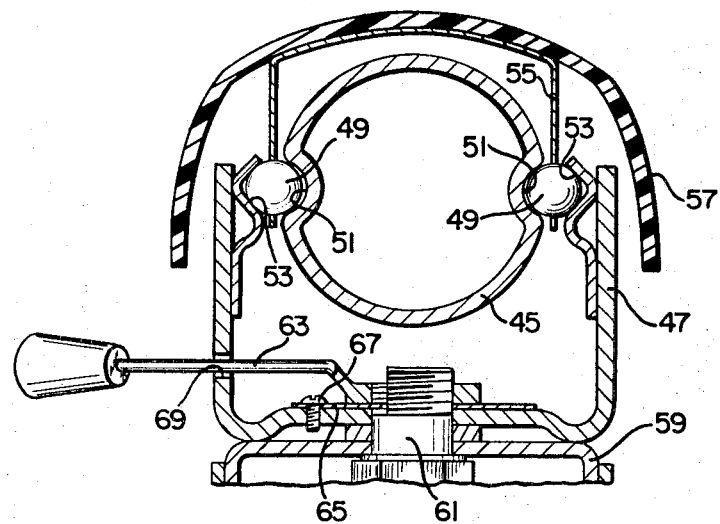
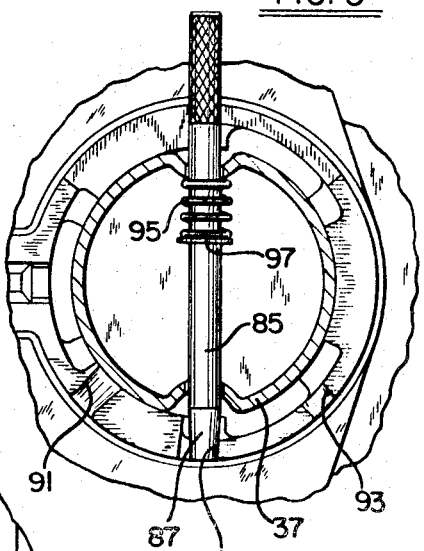
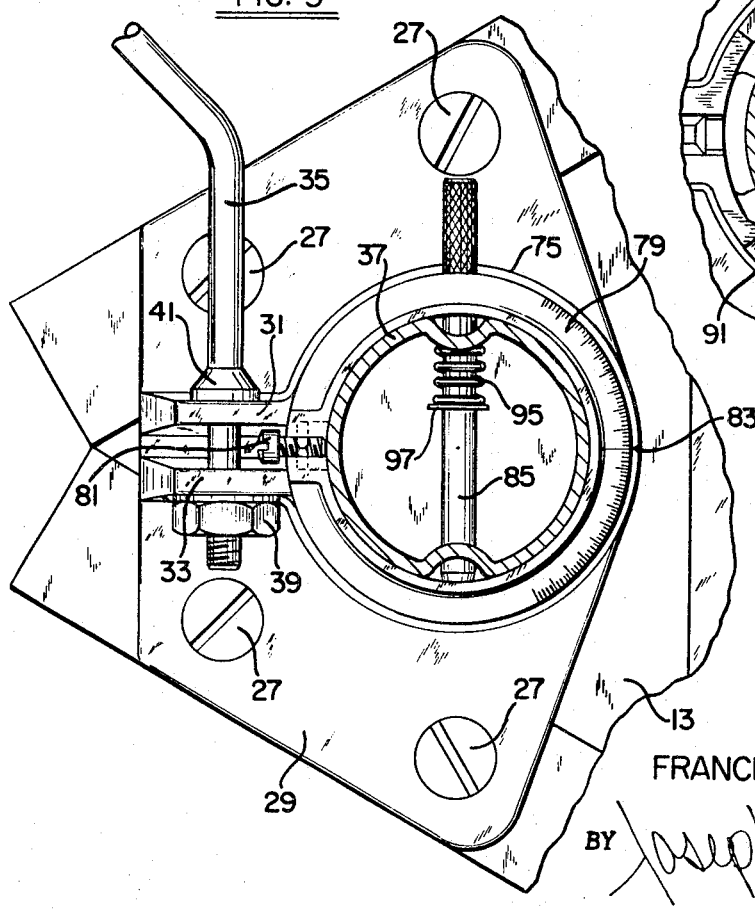
INVENTORS
MARTIN I. SHEPS
FRANCIS J. ROSENTHAL, JR.

3,540,499

RADIAL ARM SAW CONSTRUCTION

SUMMARY OF THE INVENTION

The invention is directed to an inexpensive and compact, and, at the same time, a reliable radial arm saw construction which includes a one-piece arm and column pivoted adjacent the base of the column to a base frame and which has a transversing saw carriage mounted on the arm.

Main objects of the present invention are to provide a novel radial arm saw construction which embodies simplicity and compactness and, at the same time, accommodates accuracy and reliability in performance.

Further objects are to provide a novel radial arm saw construction of the above character which is neat and aesthetically pleasing in appearance, and which is relatively inexpensive to manufacture and rugged in construction.

Other objects and advantages of this invention will become more apparent from a consideration of the detailed description to follow taken in conjunction with the drawings annexed hereto.

DESCRIPTION OF THE DRAWINGS

FIG. 3 is an enlarged sectional view of FIG. 1 taken along the line 3–3 thereof;

FIG. 4 is an enlarged sectional view of FIG. 1 taken along the line 4–4 thereof; and FIG. 5 is an enlarged, sectional view of FIG. 1 taken along the line 5–5 thereof.

BROAD STATEMENT OF THE INVENTION

Broadly described, the present invention relates to a radial arm saw construction comprising frame means, a horizontal worktable supported relative to said frame means, a generally upstanding column supported on said frame means for pivotal movement about a generally vertical axis, a horizontal arm extending over said worktable, said column and arm being constructed of one-piece hollow tubing connected by a bent portion formed on a radius, a saw carriage supported upon said arm and adapted to move longitudinally therealong, said carriage having a powered rotary saw suspended therefrom.

In another aspect, the present invention relates to a radial arm saw construction comprising a frame, a horizontal worktable on said frame, means for supporting a powered rotary saw for movement over and relative to said table including a one-piece hollow tubular column and arm including portions disposed generally at right angles to one another interconnected by a bent portion formed on a radius means pivotally supporting said column portion on said frame for movement about an axis generally perpendicular to said table, said rotary saw including a carriage, said arm and said carriage including cooperating bearing and track means permitting relative movement therebetween.

DETAILED DESCRIPTION

Figure 1:
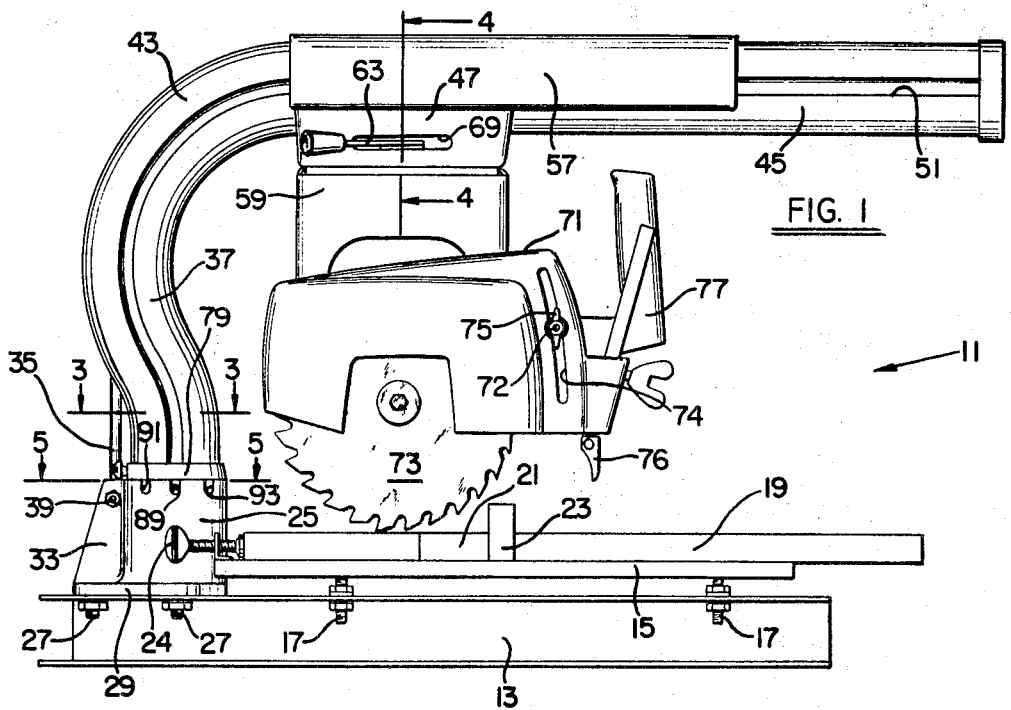
FIG. 1 is a side elevational view illustrating a radial arm saw embodying a preferred form of the present invention.

Referring now more specifically to the drawings, a radial arm saw embodying a preferred form of the invention is illustrated generally at 11 in FIG. 1 and is seen to include a base frame 13 having a pair of cleats 15 (only one of which is shown) which are secured thereto by fasteners 17. A worktable has a stationary portion 19 secured to the cleats 15 and a removable portion 21 held against a work fence 23 by a plurality of clamps 24 (only one of which is shown).

The base frame 13 has an upstanding hollow hub 25 secured thereto by fasteners 27 which extend through the frame 13 and a base plate 29 formed integrally with the hub 25. The hub 25 is preferably but not necessarily generally cylindrical in cross section and is split along its length with a pair of opposed radial flanges 31, 33 formed adjacent the split ends. An upstanding column 37 has its lower end received in and supported by the hub 25 and is adapted to be secured in place therein by drawing up on the flanges 31, 33 which reduces the internal dimension of the hub. To this end, a clamp lever 35 extends through the flanges 31, 33 and, as shown in FIG. 3, one end of the lever 35 threadedly engages a nut 39 fixed to the flange 33 while an enlargement 41 on the lever 35 presses against the flange 31. Thus, by turning the lever 35 in one direction, the flanges 31, 33 are drawn together and the hub 25 tightly grips the column 37 and locks it in place. Conversely, when the lever 35 is turned in the opposite direction, the hub 25 is loosened on the column 37 and allows it to be turned about a generally vertical or upstanding axis.

The column 37, in the embodiment of FIG. 1, is formed with a reverse curved or "gooseneck" upper portion 43 and an arm 45 extends forwardly from the gooseneck 43 and over the table 19, 21. A saw carriage 47 is supported for movement longitudinally of the arm 45 by means of linear ball bearings 49 disposed in grooves or bearing races 51, 53 formed in the arm 45 and carriage 47, respectively. The linear ball bearings 49 are conventional and are carried in space relation by a metal strip 55 and may be covered by a decorative shroud 57. Thus, as the carriage 47 is moved back and forth relative to the arm 45, the balls 49 roll in the races 51, 53 and the strip 55 and shroud 57 "float" along the arm 45 in the same direction as the carriage 47.

A powered saw is suspended from the carriage 47 and includes a frame 59 disposed immediately beneath the carriage 47. The frame 59 is secured to the carriage 47 for movement therewith longitudinally of the arm 45 but is adapted to be swiveled or pivoted about a generally vertical axis to accommodate "crosscutting" and "ripping". To this end, a threaded fastener 61 extends upwardly through adjacent faces of the frame 59 and carriage 47 and has a locking lever 63 threaded thereon. The fastener 61 is prevented from turning by a locking washer 65 keyed thereto and fixed to the carriage 47 by a screw 67. The lever 63 extends through an elongated slot 69 in the carriage 47. Thus, when the lever 63 is turned in one direction, the frame 59 is locked to the carriage 47 while turning the lever 63 in the opposite direction allows the frame 59 to be swiveled or pivoted. Preferably, detent means (not shown) is provided to help position and releasably hold the frame 59 in the "crosscutting" and "ripping" positions relative to the carriage 47.

The frame 59 supports a saw motor (not shown), which is positioned within a motor housing 71, and a saw blade 73 which is driven by the motor and supported by the housing 71. The motor housing 71 is adjustably secured to the frame 59 by a threaded fastener 72 fixed to the frame 59 and extending through an arcuate slot 74 in the housing 71 and having a wing nut 75 threaded thereon. This facilitates vertical movement of the motor housing 71 to adjust the depth of cut of the blade 73. In addition, the motor frame 71 is adapted to be pivoted relative to the frame 59 about a horizontal axis substantially parallel to the arm 45 to facilitate bevel cutting. The frame 59 also has an antikickback device 76 and a handle 77 mounted thereon for easy operator control.

As described above, the column 37 extends upwardly from the base frame 13 and hub 25 and terminates in the gooseneck portion 43 which blends into the arm 45. According to an important aspect of the invention the column 37, gooseneck 43 and arm 45 are of one-piece construction and the column 37 is pivoted on the frame 13. In a number of prior art constructions, a separate column and arm are connected by a relatively heavy, complex and expensive construction. In these prior art devices, the column is generally stationary while the arm can pivot relative thereto about a generally vertical arm for miter cutting. In addition, the depth of cut by the saw in these devices is generally varied by adjusting the arm vertically relative to the column. All of this contributes to the size and weight of the column and arm, and particularly the interconnecting structure therebetween which, of course, contributes to the overall size, weight and cost of the tool.

In the construction of the present invention, this complex interconnecting construction between the column 37 and arm 45 is dispensed with by making the arm 45 and column 37 one piece, pivoting the column 37 at its base to the frame 13 and providing a separate depth adjustment for the blade 73 such as is a achieved by the fastener, slot and nut 72, 74, 75, respectively. This significantly reduces the weight and cost of the mechanism without challenging its accuracy. Thus, miter cutting is facilitated by means of the swivel or pivot interconnection between the base of the column 37 and the hub 25 while the locking lever 35 serves to secure the column 37 and arm 45 in adjusted mitering and the right-angle cutting positions. An annular scale member 79 having a graduations thereon is adjustably secured to the column 37 by a set screw 81 and aligns with an index mark 83 on the hub 25 to accurately indicate the angular position of the arm 45 and therefore the miter angle of the blade 73. In addition, a locking pin 85 extends diametrically through the column 37 and has a tapered end 87 adapted to be received in one of three tapered openings 89, 91, 93 in the hub 25 to locate the column 37 and arm 45 for normal right-angle crosscutting, 45° bevel left and 45° bevel right, respectively, which are the most common crosscutting positions. A compression spring 95 on the pin 85 is caged between the column 37 and a washer 97 fixed to the pin 85 so as to normally bias the pin 85 toward the openings 89, 91, 93 while an outer-knurled end 99 on the pin 85 facilitates manual manipulation thereof. As described previously, depth of cut adjustment is achieved by loosening the nut 75 and raising or lowering the motor housing 71 relative to the work table.

In addition, the gooseneck 43 is constructed to provide clearance to accommodate maximum travel of the carriage 47 toward the column. This, in turn, minimizes the size of the worktable and the length of the arm 45 required for a given cutting capacity and minimizes the size, weight and cost of the tool 11.

The one-piece column 37 and arm 45 may be formed from different materials and in a variety of ways; however, very favorable results have been obtained using electrically welded steel tubing having a 2½ inches outside diameter and a wall thickness of approximately one-eighth inch. This tubing is rolled to form the grooves or bearing races 51 and thereafter is bent to form the gooseneck 43. The column 37 and arm 45 could be solid and/or could have other cross-sectional configurations, such as square, rectangular, oval, T-shaped, channel-shaped, etc., and the column 37 and arm 45 need not be uniform in cross section. In addition, other types of clamping means for the column 37, besides the split hub 25, may be used if desired.

Figure 2:
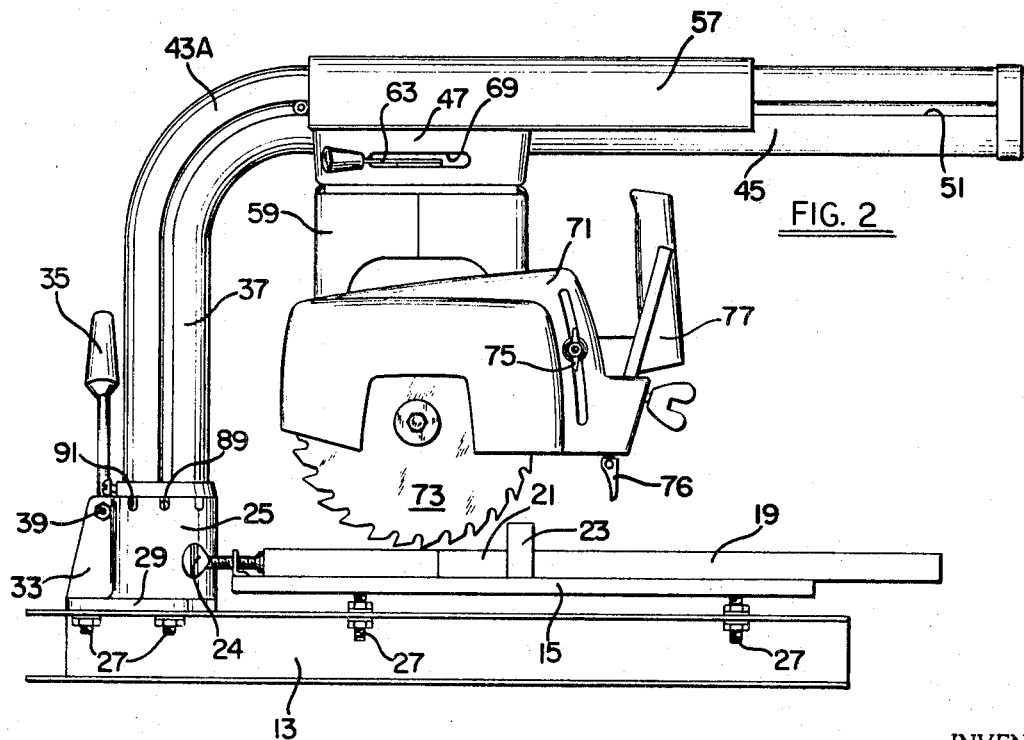
FIG. 2 is a view, similar to FIG. 1, illustrating a modified form of the invention.

The modification of FIG. 2 is substantially the same as that of FIG. 1 except that the one-piece column 37 and arm 45 has a right-angle bend 43A therebetween, rather than the gooseneck 43. This may be more desirable when forming the one-piece column and arm from other materials or using other techniques. In all other respects, the construction of FIG. 2 is the same as that described above for FIG. 1 and 3—5 so that the numerals refer to like parts.

By the foregoing, there has been disclosed a novel radial arm saw construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. A radial arm saw construction comprising frame means, a horizontal worktable supported relative to said frame means, a generally upstanding column supported on said frame means for pivotal movement about a generally vertical axis, a horizontal arm extending over said worktable, said column and arm being constructed on one-piece hollow tubing connected by a bent portion formed on a radius, a saw carriage supported upon said arm and adapted to move longitudinally therealong, said carriage having a powered rotary saw suspended therefrom.

2. A construction as defined in claim 1 wherein said frame means includes a hollow, upstanding hub adapted to receive and pivotally support said column.

3. A construction as defined in claim 2 which includes means for releasably locking said hub to said column.

4. A construction as defined in claim 2 wherein said hub is split along its length and includes means for drawing the ends thereof adjacent said split together to releasably lock said hub to said column.

5. A construction as defined in claim 1 wherein said rotary saw is adjustable in a generally vertical plane relative to said arm and said worktable.

6. A construction as defined in claim 1 wherein said one-piece column and arm include an intermediate, reversely bent portion forming a gooseneck configuration.

7. A radial arm saw construction comprising a frame, a horizontal worktable on said frame, means for supporting a powered rotary saw for movement over and relative to said table including a one-piece, hollow tubular column and arm and including portions disposed generally at right angles to one another interconnected by a bent portion formed on a radius, means pivotally supporting said column portion on said frame for movement about an axis generally perpendicular to said table, said rotary saw including a carriage, said arm and said carriage including cooperating bearing and track means permitting relative movement therebetween.

8. A construction as defined in claim 7 which includes means for adjusting said rotary saw relative to said carriage.

9. A construction as defined in claim 7 wherein said arm portion includes a pair of grooves formed therealong, said carriage having bearing means adapted to guidably ride in said grooves.

10. A construction as defined in claim 7 wherein said bent portion includes a reversely bent portion forming a gooseneck configuration.

UNITED STATES PATENT OFFICE
CERTIFICATE OF CORRECTION

Patent No. 3,540,499          Dated November 17, 1970

Inventor(s) Martin I. Sheps and Francis J. Rosenthal, Jr.

It is certified that error appears in the above-identified patent and that said Letters Patent are hereby corrected as shown below:

Column 4, line 16, "on" should be --- of ---.

SIGNED AND
SEALED
FEB 9 1971

(SEAL)
Attest:

Edward M. Fletcher, Jr.
Attesting Officer

WILLIAM E. SCHUYLER,
Commissioner of Patents

FORM PO-1050 (10-69)          USCOMM-DC 60376-1